United States Patent
Wang et al.

(10) Patent No.: US 7,547,220 B1
(45) Date of Patent: Jun. 16, 2009

(54) MEMORY CARD CONNECTOR

(75) Inventors: Chin-Chou Wang, Taipei Hsien (TW); Mei-Chuan Yang, Taipei Hsien (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 0 days.

(21) Appl. No.: 12/145,432

(22) Filed: Jun. 24, 2008

(51) Int. Cl.
*H01R 29/00* (2006.01)

(52) U.S. Cl. ...................................................... 439/188

(58) Field of Classification Search ................. 439/188, 439/189, 488, 489, 607, 630, 108
See application file for complete search history.

(56) References Cited

U.S. PATENT DOCUMENTS 6,231,362 B1 * 5/2001 Wu ............................. 439/188
6,394,853 B1 * 5/2002 Hammond et al. .......... 439/676
6,692,277 B2 * 2/2004 Hu et al. ...................... 439/188
7,241,157 B2 * 7/2007 Zhuang et al. .............. 439/188
7,309,259 B2 * 12/2007 Sun et al. ..................... 439/630

* cited by examiner

*Primary Examiner*—Chandrika Prasad
(74) *Attorney, Agent, or Firm*—WPAT, P.C.; Anthony King

(57) ABSTRACT

A memory card connector mountable onto a printed circuit board for receiving at least one kind of memory card includes an insulating housing and a shielding shell covering the insulating housing to define a receiving chamber therebetween. The shielding shell has a contacting end at a side thereof. A detecting terminal is received in a side of the insulating housing, the detecting terminal has a soldering portion adapted for electrically connecting to the printed circuit board, a resilient conductive portion adjacent to the contacting end of the shielding shell, and a resilient contact portion extending towards the receiving chamber and capable of moving outwards resiliently to push the resilient conductive portion to electrically contact the contacting end of the shielding shell.

7 Claims, 7 Drawing Sheets

MEMORY CARD CONNECTOR

BACKGROUND OF THE INVENTION

1. Field of the Invention

The present invention relates to a memory card connector, and more particularly to a memory card connector capable of detecting full insertion of a memory card without affecting the connection stability between the memory card and the memory card connector.

2. The Related Art

With the ever-increasing miniaturization and multifunction of portable electrical devices, a memory card connector for receiving and connecting a memory card to increase memory capacity is required for a portable electrical device.

Nowadays, a variety of memory card connectors are manufactured to connect with the memory cards. One kind of memory card connectors has no structure to identify whether the memory card has been fully inserted thereinto, and consequently, this kind of memory card connector can't guarantee the stable connection between the memory card and the memory card connector. As a result, the connection between the memory card and the memory card connector is susceptible to sudden disconnection in case that the memory card is not fully inserted into the memory card connector, which results in unstable signal transmission between the memory card and the memory card connector.

Another kind of memory card connectors has the structure to determine whether the memory card has been fully inserted thereinto. The memory card connector has a detecting terminal disposed at a bottom of the insertion chamber and a metallic shell. When the memory card is fully inserted into the insertion chamber, the detecting terminal is pressed downwardly by the memory card to electrically connect with the metallic shell to keep that the memory card is fully inserted into the memory card connector. This kind of detecting construction however, adversely affects steady electrical connection between the memory card and the memory card connector, because of the lift up of the memory card by the detecting terminal during insertion process. So this memory card connector is not suitable for portable electrical device.

SUMMARY OF THE INVENTION

Accordingly, an object of the present invention is to provide a memory card connector capable of detecting full insertion of a memory card without affecting connection stability between the memory card and the memory card connector.

A memory card connector mountable onto a printed circuit board for receiving at least one kind of memory card includes an insulating housing and a shielding shell covering the insulating housing to define a receiving chamber therebetween. The shielding shell has a contacting end at a side thereof. A detecting terminal is received in a side of the insulating housing, the detecting terminal has a soldering portion adapted for electrically connecting to the printed circuit board, a resilient conductive portion adjacent to the contacting end of the shielding shell, and a resilient contact portion extending towards the receiving chamber and capable of moving outwards resiliently to push the resilient conductive portion to electrically contact the contacting end of the shielding shell.

As described above, the memory card connector has the detecting terminal disposed at a side of the receiving chamber, when the memory card is fully inserted into the receiving chamber, the detecting terminal is pushed out by the memory card to deform elastically and connect with the contacting end, which is not only able to detect whether the memory card is fully inserted into the memory card connector without affecting the connection between the memory card connector and the memory card, but also beneficial to fix the memory card to the memory card connector to prevent the memory card from moving so as to enhance stability of electrical connection.

BRIEF DESCRIPTION OF THE DRAWINGS

The present invention will be apparent to those skilled in the art by reading the following description when taken in conjunction with the accompanying drawings, in which.

DETAILED DESCRIPTION OF THE PREFERRED EMBODIMENTS

Figure 1:
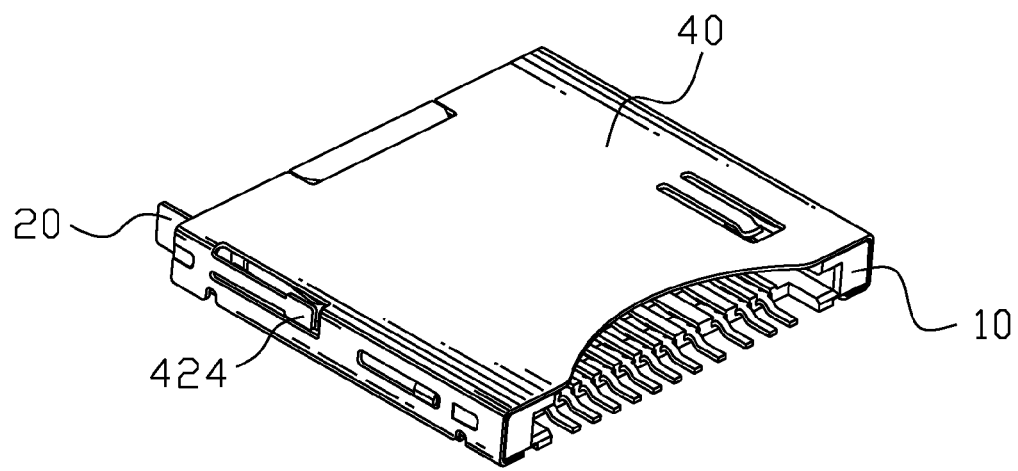
FIG. 1 is an assembled, perspective view of a memory card connector of an embodiment in accordance with the present invention.
Figure 2:
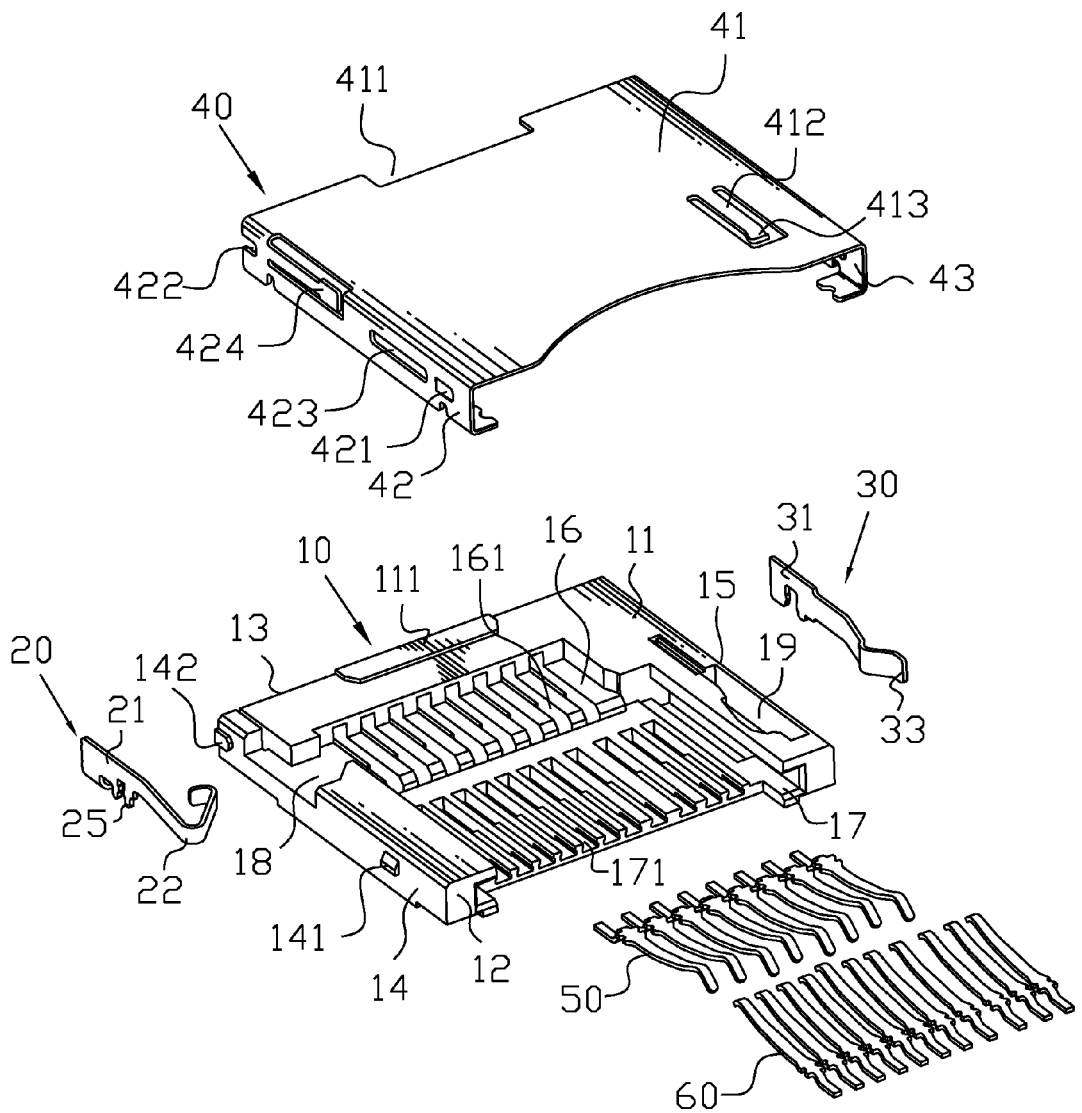
FIG. 2 is an exploded, perspective view of the memory card connector shown in FIG. 1.

With reference to FIG. 1 and FIG. 2, an embodiment of a memory card connector according to the present invention is shown. The memory card connector includes an insulating housing 10, a detecting terminal 20, a fixing terminal 30, a shielding shell 40 and a plurality of first and second terminals 50, 60.

The insulating housing 10 is substantially rectangular and defines an upper surface 11, a front side 12, a rear side 13 and two opposite lateral sides 14, 15. The upper surface 11 is recessed downwardly to form a first receiving cavity 16 near the rear side 13 and a second receiving cavity 17 communicating with the first receiving cavity 16. A bottom of the first receiving cavity 16 has a plurality of first terminal recesses 161 for receiving the first terminal 50. An end of the first terminal recess 161 extends to pass through the rear side 13. The second receiving cavity 17 passes through the front side 12 and has a plurality of second terminal recesses 171 formed a bottom thereof for receiving the second terminals 60 therein. Both bottom sides of the second receiving cavity 17 respectively extend toward the lateral sides 14, 15 to a predetermined distance. The first and second terminal recesses 161, 171 are all arranged to extend forward and backward and at intervals. The upper surface 11 has a protrusion portion 111. The protrusion portion 111 is of strip-board shape and adjacent to the rear side 13.

Figure 3:
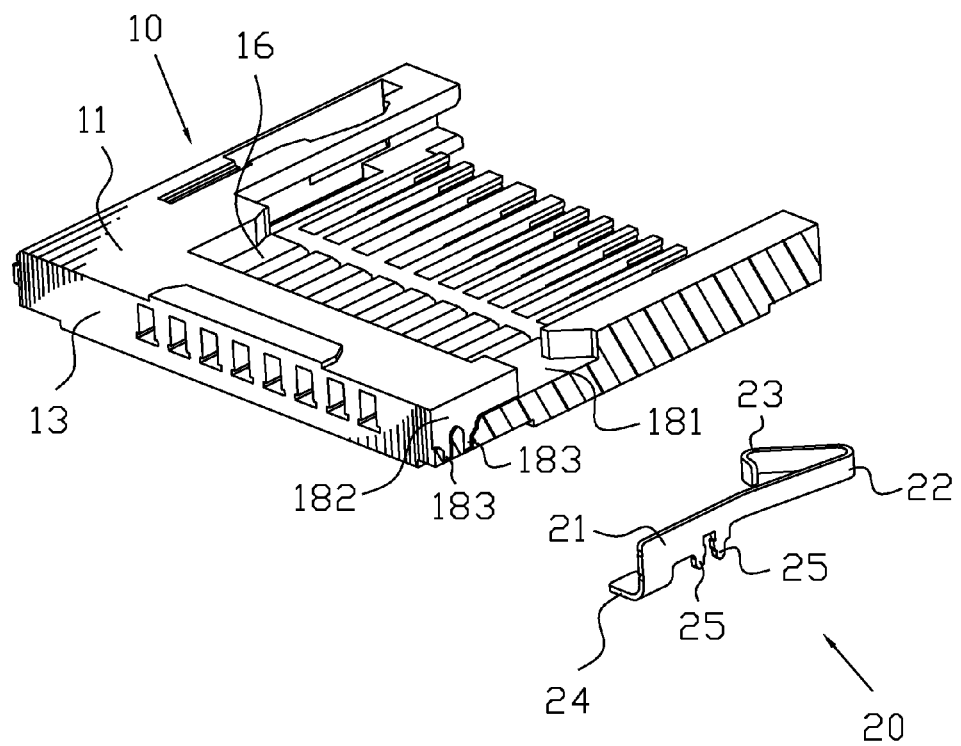
FIG. 3 is a cross-sectional view of an insulating housing of the memory card connector shown in FIG. 2 seen from the left view, wherein a detecting terminal is located near the insulating housing.

Referring to FIG. 2 and FIG. 3, the upper surface 11 of the insulating housing 10 has a lateral recess 18 for receiving the detecting terminal 20. The lateral recess 18 includes a first recess 181 communicating with the first receiving cavity 16 and passing through the lateral side 14, and a second recess 182 communicating with the first recess 181 and extending to reach the rear side 13. The second recess 182 is narrower than the first recess 181. A bottom of the second recess 182 has two fixing cavities 183 defined therein.

Figure 6:
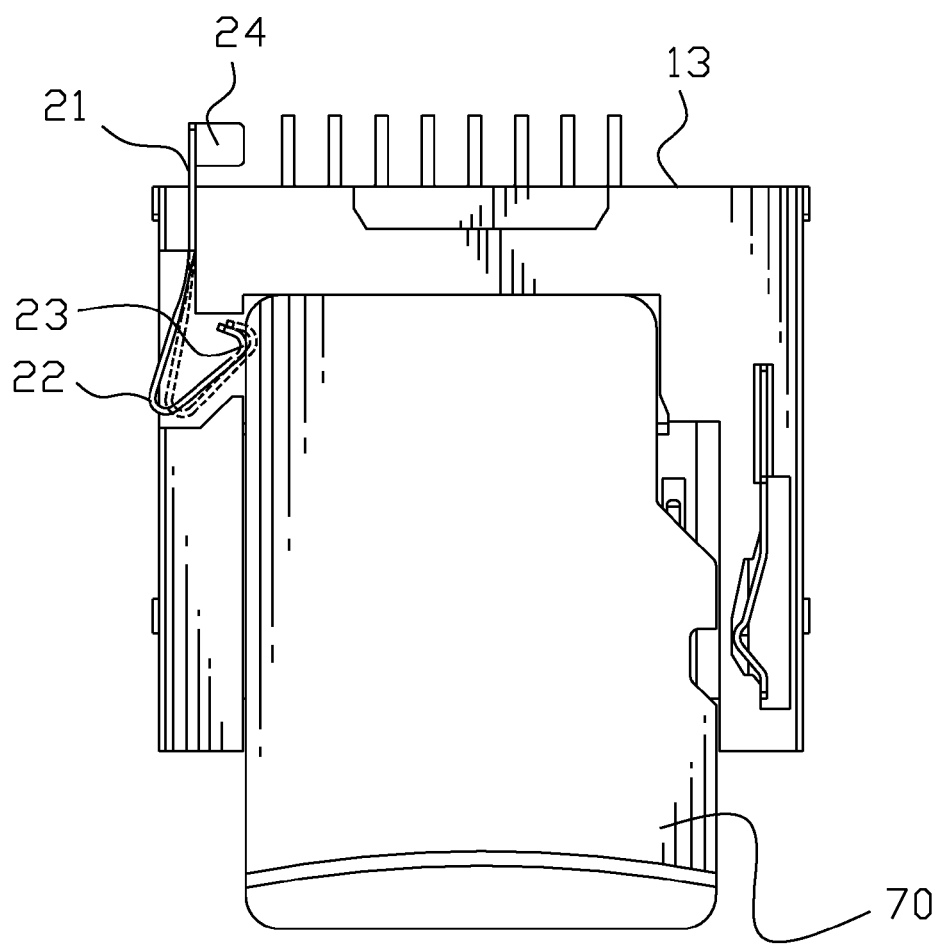
FIG. 6 is a plan view of the detecting terminal shown in FIG. 1 seen from the top view when a memory card is inserted into the memory card connector, wherein the shielding shell is removed.

Referring to FIG. 3 and FIG. 6, the detecting terminal 20 made of a metal sheet has a main body 21. The main body 21 is a longwise-board shape and partly received in the second recess 182. An end of the main body 21 extends and is inclined outwards to form a resilient conductive portion 22. A free end of the resilient conductive portion 22 extends and bends inwards to form a resilient contact portion 23 with a sharp angle formed therebetween. A free end of the resilient contact portion 23 bends toward the resilient conductive portion 22 to show an arc shape for contacting a memory card (not shown) smoothly. The resilient conductive portion 22 and the resilient contact portion 23 are all received in the first recess 181. A side of the main body 21 extends perpendicularly to form a soldering portion 24 away from the resilient conductive portion 22 and disposed out of the rear side 13 of the insulating housing 10 for being soldered on a printed circuit board (not shown), and two fixing pieces 25 extend outwards from the bottom side of the main body 21 corresponding to the fixing cavities 183. The fixing pieces 25 respectively are inserted into the corresponding fixing cavities 183 for fixing the detecting terminal 20 to the insulating housing 10.

Figure 4:
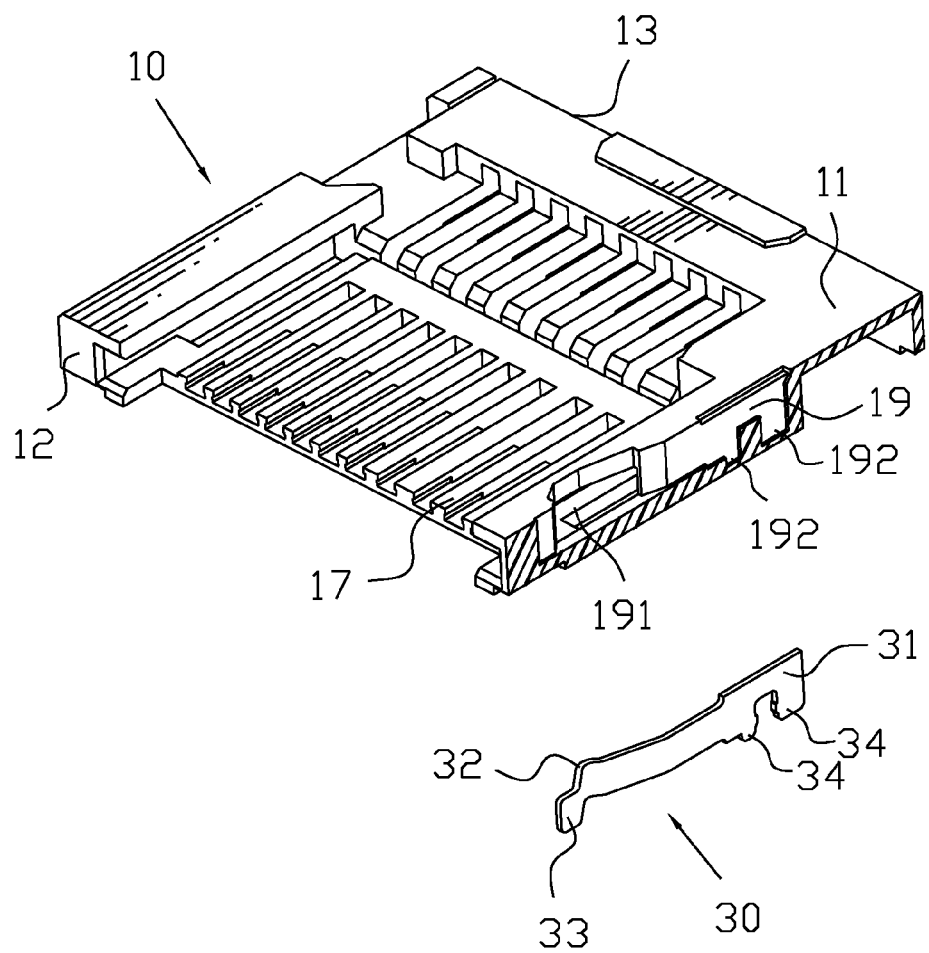
FIG. 4 is a cross-sectional view of the insulating housing of the memory card connector shown in FIG. 2 seen from the right view, wherein a fixing terminal is located near the insulating housing.

Referring to FIG. 2 and FIG. 4, the upper surface 11 of the insulating housing 10 has a fixing slot 19 extending forward and backward near the lateral side 15, and a bottom side of the fixing slot 19 near the front side 12 defines an opening 191 facing the second receiving cavity 17. A bottom of the fixing slot 19 has two fixing recesses 192 near the rear side 13.

The fixing terminal 30 received in the fixing slot 19 has a basic body 31, and an end of the basic body 31 extends angularly upwardly and bends oppositely to form a propping portion 32. The propping portion 32 is of arc-shape and partly protrudes in the second receiving cavity 17 through the opening 191. A free end of the propping portion 32 extends horizontally to form a stopping end 33 which is received in an end of the fixing slot 19 near the front side 12. A bottom side of the basic body 31 extends downwardly to form two fixing patches 34 corresponding to the fixing recesses 192. The fixing patches 34 respectively are inserted into the corresponding fixing recesses 192 for fixing the fixing terminal 30 to the insulating housing 10.

Figure 5:
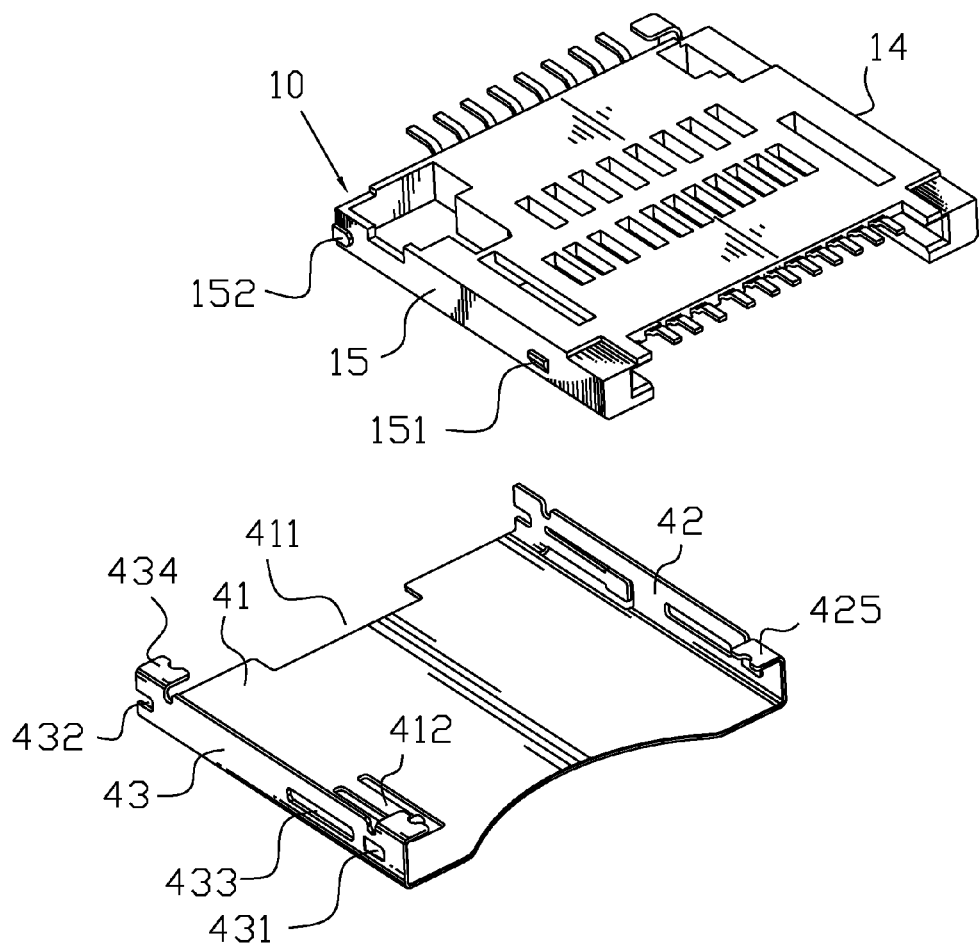
FIG. 5 is a plan view of the memory card connector shown in FIG. 1 viewed from bottom, wherein a shielding shell is separated from the insulating housing.

With reference to FIG. 2 and FIG. 5, the lateral side 14 has a first lump 141 formed at a front end thereof and a first block 142 disposed at an opposite end thereof. An end of the block 142 is at the same level as the rear side 13. The lateral side 15 has a second lump 151 and a second block 152 disposed to be uniform to the first lump 141 and first block 142.

The shielding shell 40 mating with the insulating housing 10 has a basic plate 41 and two side plate 42, 43 respectively extending downward from two opposite sides of the basic plate 41. The basic plate 41 is oblong and has a stopping opening 411 formed at a rear end thereof corresponding to the protrusion portion 111. A front end of the basic plate 41 is punched to form a cantilever portion 412 near the side plate 43. A free end of the cantilever portion 412 extends downwardly and then bends oppositely to form a cantilever end 413 for pressing the memory card. The side plate 42 has a first buckling piece 421 formed at a front end thereof for abutting the insulating housing 10 and a first mating opening 422 formed at a rear end thereof. A first leading hole 423 corresponding to the first lump 141 is formed at the side plate 42 and adjacent to the first buckling piece 421. A side of the first leading hole 423 extends a certain distance toward the first mating opening 422. The side plate 42 is punched to form a contacting end 424 corresponding to the resilient conductive portion 22. The contacting end 424 is a cantilever and located between the first mating opening 422 and the first leading hole 423. A bottom side of the side plate 42 bends inwardly to form a first catch 425 near the first mating opening 422. The side plate 43 has a second buckling piece 431, a second mating opening 432 and a second leading hole 433 respectively similar to the first buckling piece 421, the first mating opening 422 and the first leading hole 423. Two second catches 434 similar to the first catch 425 are arranged at two ends of a bottom side of the side plate 43.

Referring to FIGS. 1-2 and FIG. 5, in assembly, the lateral side 15 of the insulating housing 10 inclines downwards to partly abut the side plate 43 of the shielding shell 40 with the second lump 151 inserting into the second leading hole 433, and the lateral side 14 is pressed downwards to abut the side plate 42 with the first lump 141 inserting into the first leading hole 423, and then the insulating housing 10 is pushed to slide in the shielding shell 40 slowly until the stopping opening 411 mating with the protrusion portion 111 and the first and second mating opening 422, 432 coupling with the first and second block 142, 152 respectively, thus a receiving chamber is formed between the shielding shell 40 and the insulating housing 10. The first and second catches 425 and 434 are pressed against a bottom of the insulating housing 10 for fastening the shielding shell 40 and the insulating housing 10 together. This method of assembly of the memory card connector can efficiently reduce deformation of the shielding shell 40.

As shown in FIG. 1 and FIG. 6, before a micro secure digital (micro SD) card 70 is not inserted into the first receiving cavity 16, the resilient conductive portion 22 is completely located in the first recess 181 and spaced a certain distance away from the contacting end 424 of the shielding shell 40. When the micro SD card 70 is fully inserted into the first receiving cavity 16, the micro SD card 70 pushes the resilient contact portion 23 to move outwards resiliently so as to push the resilient conductive portion 22 to electrically contact the contacting end 424. By this manner, the memory card connector offers the function of detecting whether the micro SD card 70 is fully inserted thereinto. Furthermore, the elastic deformation force of the detecting terminal 20 is applied to a side of the micro SD card 70, which effectively prevents the micro SD card 70 from moving left and right. Consequently, it guarantees that the micro SD card 70 is connected with the first terminals 50 steadily.

Figure 7:
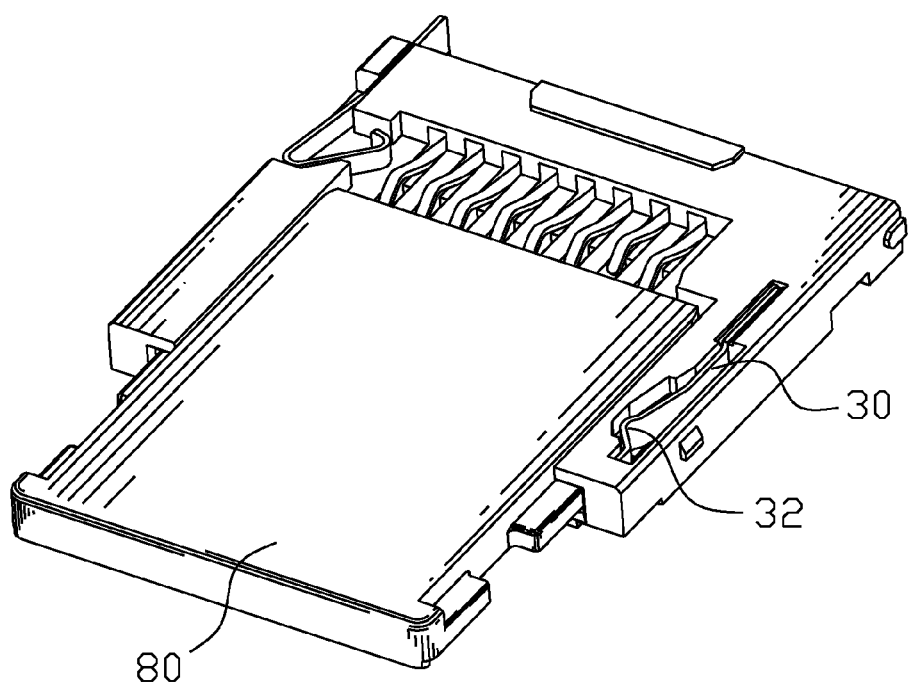
FIG. 7 is an assembled, perspective view of the memory card connector shown in FIG. 1 seen from another view, wherein the shielding shell is removed and a memory stick card is inserted thereinto.

Referring to FIG. 7, when a memory stick card 80 is inserted into the second receiving cavity 17, the propping portion 32 of the fixing terminal 30 is pushed to move back to the fixing slot 19 and deform elastically, after the memory stick card 80 is fully inserted therein, the propping portion 32 restores antitype and is inserted into a cavity of the memory stick card 80 for preventing the memory stick card 80 from moving, which can guarantee the memory stick card 80 to electrically connect with the second terminals 60 steadily.

As described above, the memory card connector has the detecting terminal 20 disposed at a side of the first receiving cavity 16, when the micro SD card 70 is inserted into the first receiving cavity 16, the resilient contact portion 23 of the detecting terminal 20 is pushed by the micro SD card 70 to move outward resiliently so as to push the resilient conductive portion 22 to electrically contact the contacting end 424, which is not only able to detect whether the micro SD card 70 is fully inserted into the memory card connector without affecting the connection between the first terminals 50 and the micro SD card 70, but also is beneficial to fix the micro SD card 70 to the memory card connector to prevent the micro SD card 70 from moving so as to enhance stability of electrical connection.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A memory card connector mountable onto a printed circuit board for receiving at least one kind of memory card, comprising:
    an insulating housing;
    a shielding shell covering the insulating housing to define a receiving chamber therebetween, the shielding shell having a contacting end at a side thereof; and
    a detecting terminal received in a side of the insulating housing, the detecting terminal having a soldering portion adapted for electrically connecting to the printed circuit board, a resilient conductive portion adjacent to the contacting end of the shielding shell, and a resilient contact portion extending towards the receiving chamber and capable of moving outwards resiliently to push the resilient conductive portion to electrically contact the contacting end of the shielding shell.

2. The memory card connector as claimed in claim 1, wherein the detecting terminal has a main body of longwise-board shape fixed in the insulating housing, a front end of the main body extends and inclines outwards to form the resilient conductive portion, a free end of the resilient conductive portion extending and bending inwards to form the resilient contact portion to define a sharp angle therebetween, a free end of the resilient contact portion bends towards the resilient conductive portion to show an arc-shape.

3. The memory card connector as claimed in claim 2, wherein the main body extends downwardly to form at least one fixing piece for being jammed into at least one fixing cavity defined in the insulating housing.

4. The memory card connector as claimed in claim 1, wherein the contacting end of the shield shell is a cantilever punchedly formed at the side of the shield shell.

5. The memory card connector as claimed in claim 1, wherein a top of the shield shell is punched to form a cantilever portion adapted to press against the memory card.

6. The memory card connector as claimed in claim 1, further comprising a fixing terminal received in a side of the insulating housing opposite to the detecting terminal, the fixing terminal having a propping portion partly protruding into the receiving chamber.

7. The memory card connector as claimed in claim 6, wherein the fixing terminal defines a basic body connecting with the propping portion, the basic body extends outwards to form at least one fixing patch, the insulating housing has at least one fixing recess for receiving the corresponding fixing patch.

* * * * *